(12) United States Patent
Salter et al.

(10) Patent No.: US 9,463,734 B2
(45) Date of Patent: Oct. 11, 2016

(54) ILLUMINATED SEATBELT ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); Edward Joseph DeSmet, Jr., Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/883,126

(22) Filed: Oct. 14, 2015

(65) Prior Publication Data
US 2016/0031367 A1 Feb. 4, 2016

Related U.S. Application Data

(63) Continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/00* | (2006.01) |
| *F21V 8/00* | (2006.01) |
| *F21V 9/16* | (2006.01) |
| *B60R 22/18* | (2006.01) |
| *B60Q 3/02* | (2006.01) |

(52) U.S. Cl.
CPC ............ *B60Q 3/004* (2013.01); *B60Q 3/008* (2013.01); *B60Q 3/0209* (2013.01); *B60Q 3/0279* (2013.01); *B60Q 3/0283* (2013.01); *B60R 22/18* (2013.01); *F21V 9/16* (2013.01); *G02B 6/0096* (2013.01); *B60Q 2500/10* (2013.01); *B60R 2022/1806* (2013.01)

(58) Field of Classification Search
CPC ... A44B 11/2565; B60Q 3/008; B60Q 3/0243; B60Q 3/0293; B60R 22/18; B60R 22/1806; B60R 22/1812; F21K 9/56; F21V 9/16; H05B 37/0218; H05B 37/0227
USPC ................................. 362/487–488, 509–510
See application file for complete search history.

(56) References Cited

U.S. PATENT DOCUMENTS

| | | | |
|---|---|---|---|
| 5,709,453 | A | 1/1998 | Krent et al. |
| 5,892,436 | A | 4/1999 | Blackburn et al. |
| 6,117,362 | A | 9/2000 | Yen et al. |
| 6,577,073 | B2 | 6/2003 | Shimizu et al. |
| 6,729,738 | B2 | 5/2004 | Fuwausa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

An illuminated vehicle seatbelt assembly is provided herein. The vehicle seatbelt assembly includes a buckle having a housing and a latch mechanism. A light source is disposed within the housing. A light guide directs light from the light source to a top portion of the housing. A first photoluminescent structure is disposed within the buckle and is configured to luminesce in response to excitation by the light source.

20 Claims, 13 Drawing Sheets

(56) References Cited

U.S. PATENT DOCUMENTS

| | | |
|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2001/0033492 A1* | 10/2001 | Rogers ............... B60Q 3/004 362/483 |
| 2002/0122307 A1 | 9/2002 | Ellis et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0261588 A1 | 11/2006 | Kohama |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2010/0013622 A1* | 1/2010 | Rumps ............... A44B 11/2565 340/457.1 |
| 2011/0012062 A1 | 1/2011 | Agrawal et al. |
| 2012/0001406 A1 | 1/2012 | Paxton et al. |
| 2012/0089302 A1 | 4/2012 | Griffin |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0239853 A1 | 8/2014 | Woodham |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 202004007872 U1 | 9/2004 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

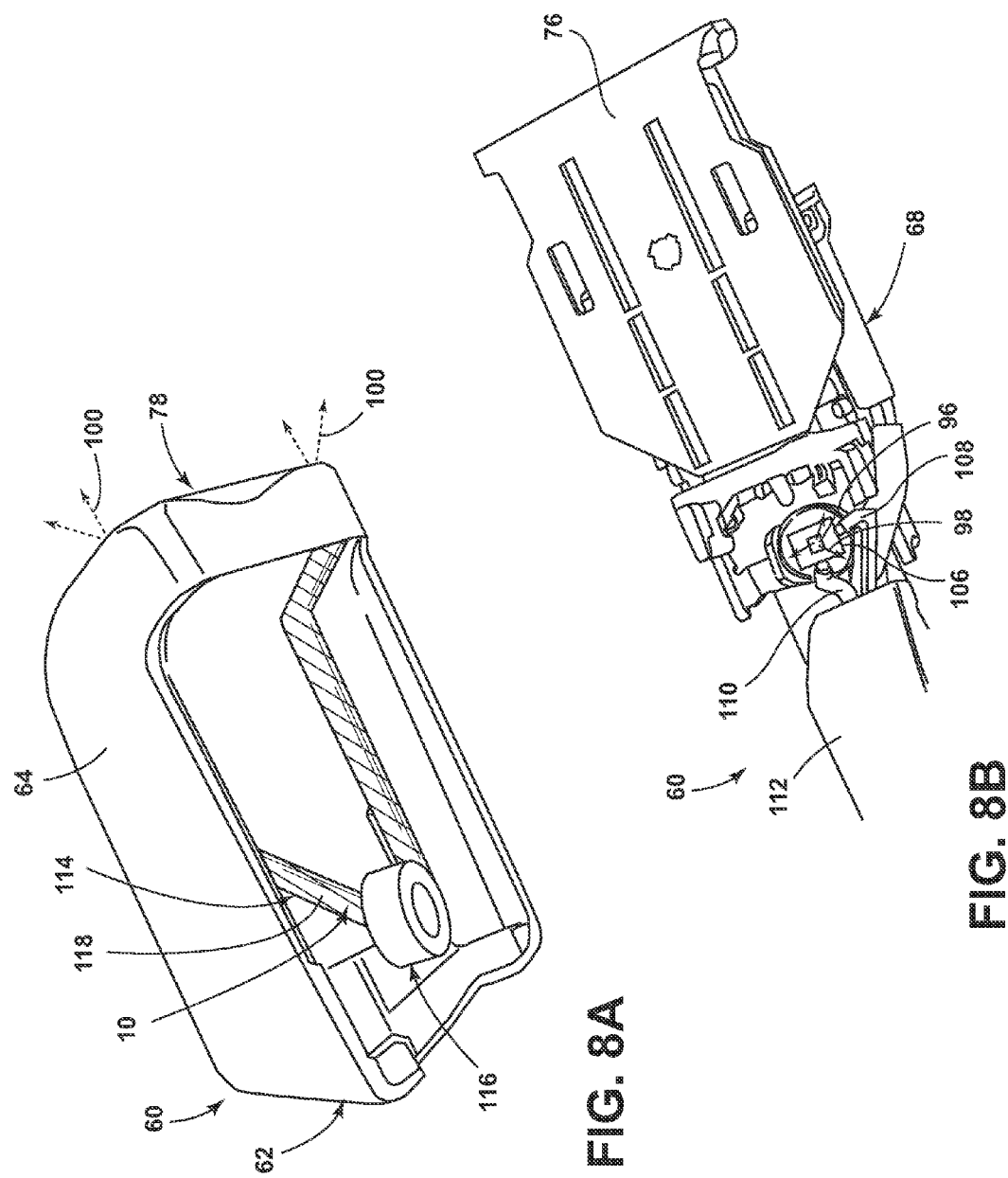

ILLUMINATED SEATBELT ASSEMBLY

CROSS-REFERENCE TO RELATED APPLICATION

This application is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related application is hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, an illuminated buckle is disclosed. The illuminated buckle includes a housing and a latch mechanism. A first light source is disposed within the housing. A first light guide directs light from the first light source towards a surface of the housing. A first photoluminescent structure is optically coupled with the light guide and configured to luminesce in response to excitation by the light source.

According to another aspect of the present disclosure, a seatbelt buckle for a vehicle is disclosed. The seatbelt buckle includes a housing and a latch mechanism. A first light source is disposed within the housing and is optically coupled to a first light guide that is configured to illuminate a first portion of the buckle. A second light source is disposed within the housing and is optically coupled to a second light guide that is configured to illuminate a second portion of the buckle. A luminescent structure is configured to emit outputted light in response to excitation by inputted light emitted by the first light source.

According to yet another aspect of the present disclosure, a seatbelt buckle is disclosed. The seatbelt buckle includes a housing. A latch mechanism is disposed within the housing. A first light source is disposed within the housing and optically coupled to a first light guide. A second light source is disposed within the housing and optically coupled to a second light guide. A diffuser is disposed in an aperture in the housing and proximate one end portion of the first light guide. The diffuser is configured to direct light outward from the housing.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8A is a bottom perspective view of an upper portion of a housing that forms the buckle having a light guide attached to an inner surface thereof, according to one embodiment;

FIG. 8B is a top perspective view of the latch mechanism having a light source disposed thereon, according to one embodiment, that cooperates with the light guide of FIG. 8A;

DETAILED DESCRIPTION OF THE PREFERRED EMBODIMENTS

Figure 2:
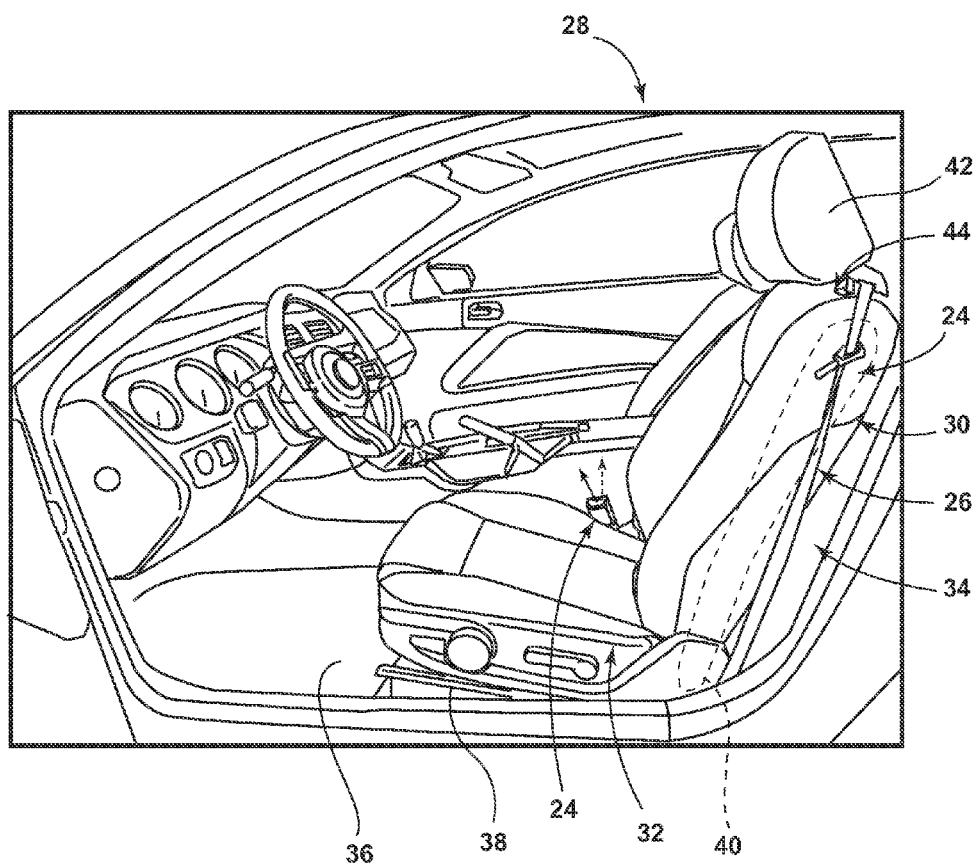
FIG. 2 is a perspective view of the lighted seatbelt assembly employed adjacent to a driver's seat according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated seatbelt assembly for a vehicle that employs a lighting system. The seatbelt assembly may advantageously employ one or more photoluminescent structures to illuminate in response to pre-defined events. The one or more photoluminescent structures may be configured to convert light received from an associated light source and re-emit the light at a different wavelength typically found in the visible spectrum.

Figure 1A:
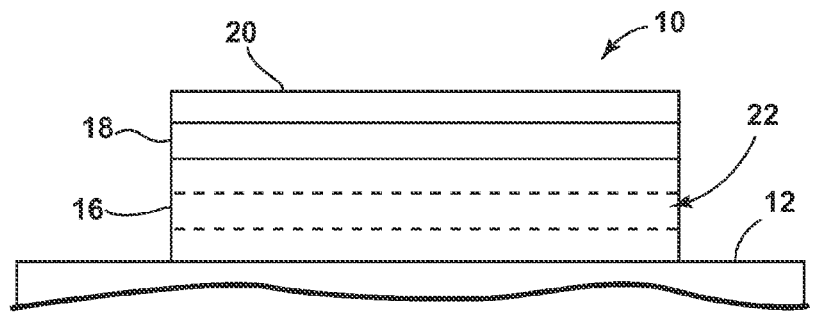
FIG. 1A is a side view of a photoluminescent structure rendered as a coating for use in a luminescent illuminated seatbelt assembly according to one embodiment.
Figure 1B:
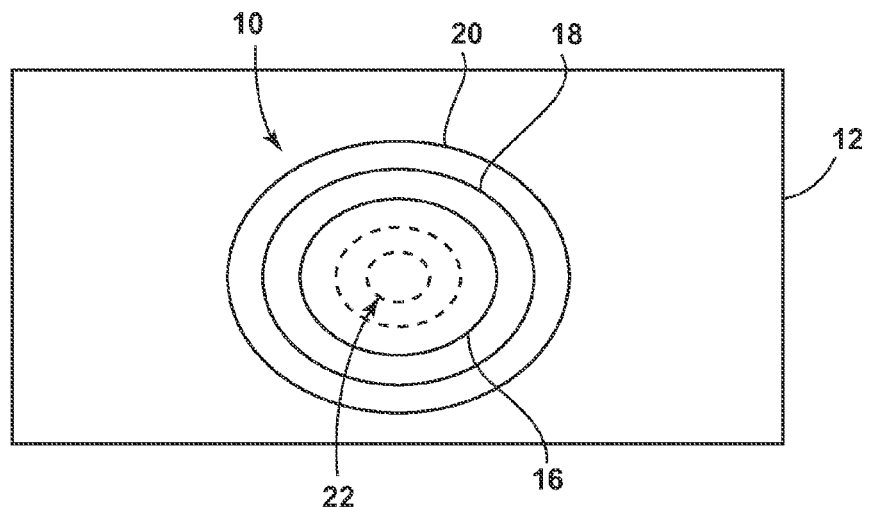
FIG. 1B is a top view of a photoluminescent structure rendered as a discrete particle according to one embodiment.
Figure 1C:
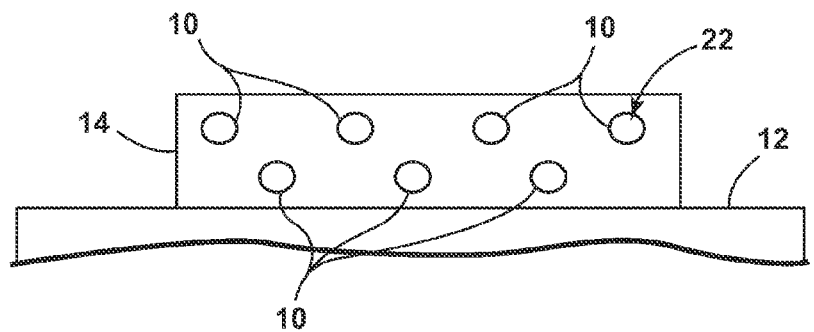
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 22 having energy converting elements with phosphorescent or fluorescent properties. Each photoluminescent material 22 may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) 22 found in the energy conversion layer 16. The process of using converted light outputted from one photoluminescent material 22 to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures 10 may operate under either conversion principle.

The energy conversion layer 16 may be prepared by dispersing the photoluminescent material 22 in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material 22 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material 22 contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S.

Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Referring now to FIG. 2, a lighting system 24 is shown disposed within a seatbelt assembly 26 of a vehicle 28 that is configured to illuminate an area proximate a seating assembly 30 and/or components thereof, according to one embodiment. The seating assembly 30 includes a seat 32 pivotally coupled with a seatback 34. The seat 32 may be slidably coupled with a floor 36 of the vehicle 28 about a track assembly 38. The track assembly 38 may be configured to allow the vehicle seating assembly 30 to be adjusted in a forward and a rearward direction relative to the vehicle 28. It is understood that the seating assembly 30 may be positioned at various locations through the vehicle 28 other than the illustrated position, such as passenger side location, a mid-row location, and rear seat location. It is also conceivable that the seat 32 may not include the track assembly 38 and may be otherwise movably attached to the vehicle 28, or alternatively may be fixedly coupled with the floor 36 of the vehicle 28. Further, it will be appreciated that the lighting system 24 described herein may be utilized on any portion of any seating assembly 30 disposed within a vehicle 28.

The seatback 34 of the seating assembly 30 may include side supports 40 that pivotally couple with a rear portion of the seat 32 and extend upward from the seat 32 to a top portion of the seatback 34. The seatback 34 also includes a cushion and an upholstery material disposed over the cushion substantially enclosing the seatback 34. A headrest 42 may be removably and adjustably coupled with the top portion of the seatback 34 and may be substantially centered therein. Accordingly, an attachment structure 44 for the headrest 42 may include the seatback 34 and more specifically, the upper portion of the seatback 34. It will be appreciated that the seatbelt assembly 26 described herein may be utilized for any vehicle 28 such as, but not limited to, coupes, sedans, trucks, sport utility, vans, and the like. Further, it will be appreciated that any lighting system 24 found elsewhere on the vehicle 28 may also be manufactured in accordance with the principles of the present disclosure.

Figure 3:
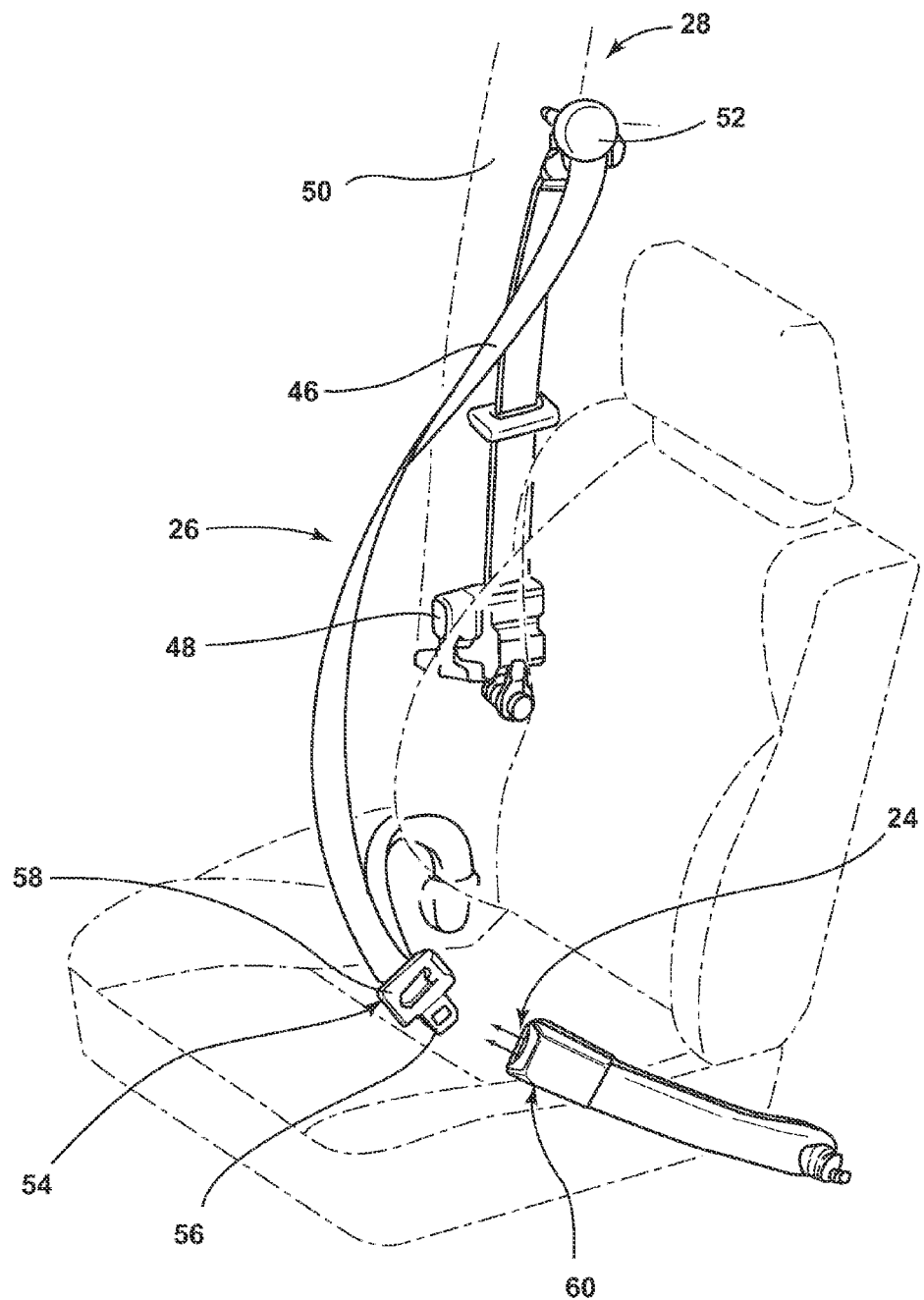
FIG. 3 is a perspective side view of a passenger seat disposed within a vehicle cabin with the seatbelt assembly in an unlatched condition employing a lighting system, according to one embodiment.

As shown in FIG. 3, the seatbelt assembly 26 includes a belt webbing 46 that is coupled to the seating assembly 30 or the vehicle 28 at one end and further coupled to a retractor 48 disposed within a B-pillar 50 of the vehicle 28 at the opposing end. The retractor 48 may also be located externally to the B-pillar 50 of the vehicle 28, and it is further contemplated that separate belt webbing 46 may be coupled to the vehicle seat 32 or the vehicle 28 using a second retractor 48 in a dual retractor system. The B-pillar 50 is generally disposed between a front passenger door and a rear passenger side door. As coupled to the retractor 48, the belt webbing 46 is retractable thereby allowing a vehicle occupant to move a seatbelt assembly 26 component for latching the seatbelt assembly 26. It will be appreciated that any other seatbelt orientation may also be utilized for implementation of the lighting system 24 described herein.

In the embodiment shown in FIG. 3, the belt webbing 46 is coupled to a D-ring 52, or turning loop, which may be vertically adjustable along the B-pillar 50 for accommodating various vehicle occupants. The seatbelt assembly 26 further includes a tongue member 54 which is operably coupled to the belt webbing 46 and may be slidable along the belt webbing 46 for adjustable movement therealong. The tongue member 54 includes a buckle portion 56 and a mounting portion 58. The mounting portion 58 is coupled to and slidable along a portion of the belt webbing 46. The buckle portion 56 is configured to releasably couple to a seatbelt buckle 60 for restraining an occupant within the vehicle 28.

Figure 4:
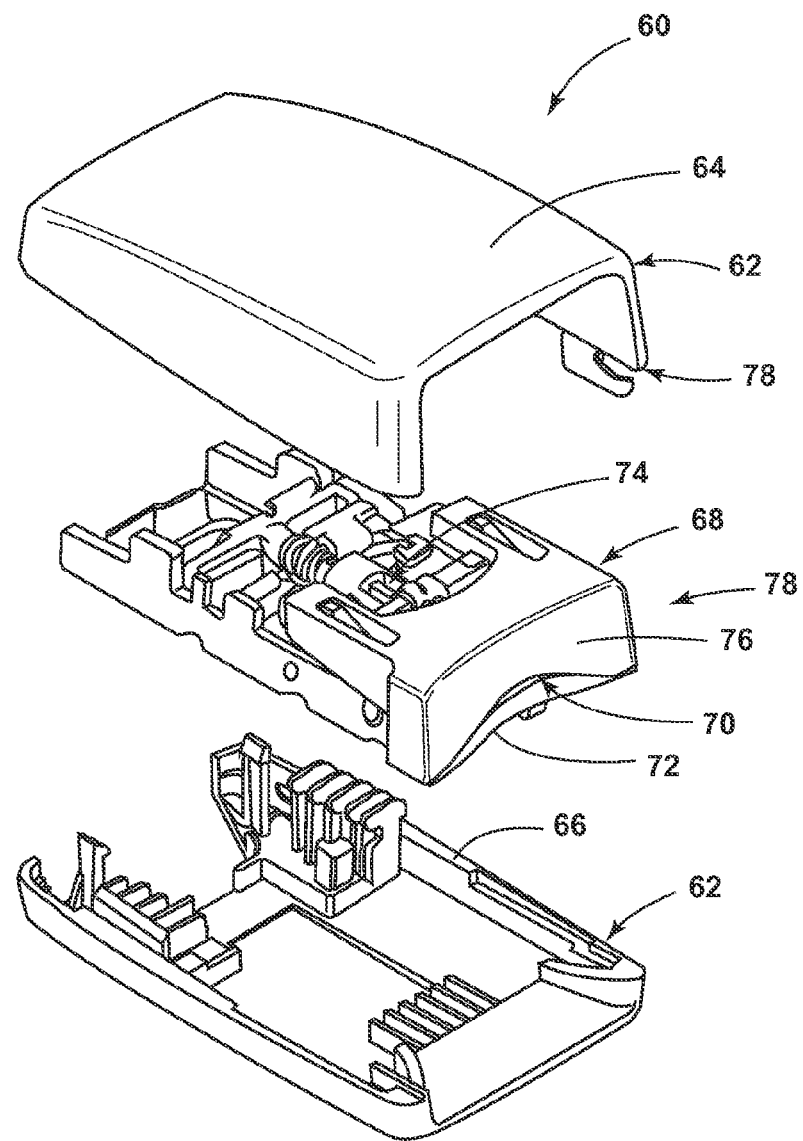
FIG. 4 is an exploded view of a seatbelt buckle, according to one embodiment.

Referring to FIG. 4, the seatbelt buckle 60 includes a housing 62 having an upper portion 64 and a power portion 66 that are configured to mate with one another forming a cavity therebetween. It will be appreciated, however, that the housing 62 may be made from any number of portions without departing from the teachings provided herein. A latch mechanism 68 is disposed within the cavity. The latch mechanism 68 is configured to releasably couple the seatbelt tongue buckle portion 56 to the seatbelt buckle 60. The latch mechanism 68 includes a tongue receiving slot 70 that may be surrounded by a funneling feature 72 that partially or completely surrounds the receiving slot 70 and serves as a guide for urging the buckle portion 56 into the receiving slot 70. The buckle housing 62, and funneling feature 72, may be comprised of a rigid polymeric material in assembly. For latching the seatbelt assembly 26, a user may grasp the seatbelt buckle 60, and pull the retractable belt webbing 46 outwardly to bring the seatbelt buckle 60 into contact with the tongue member 54. In this way, the seatbelt buckle 60 and the tongue member 54 are moveably associated with one another between a latched condition and an unlatched condition. A manually depressible release button 76 is disposed proximate a top surface 78 of the buckle 60 and is configured to release the seatbelt buckle 60 from the seatbelt tongue buckle portion 56.

Figure 5:
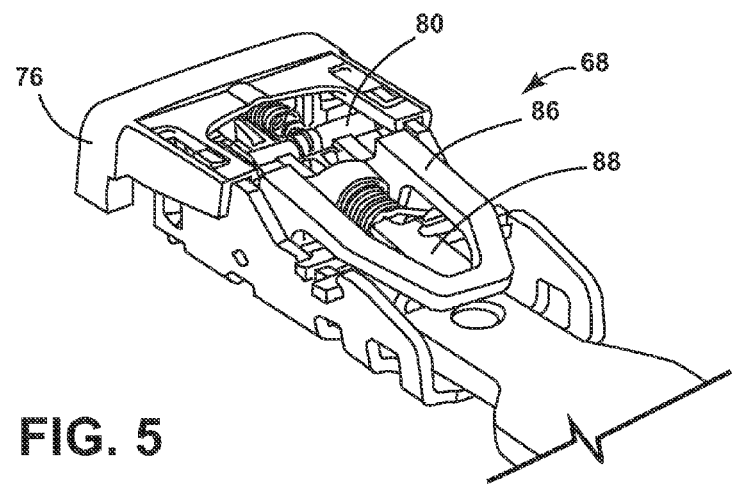
FIG. 5 is a top perspective view of a latch mechanism disposed within the buckle, according to one embodiment.
Figure 6:
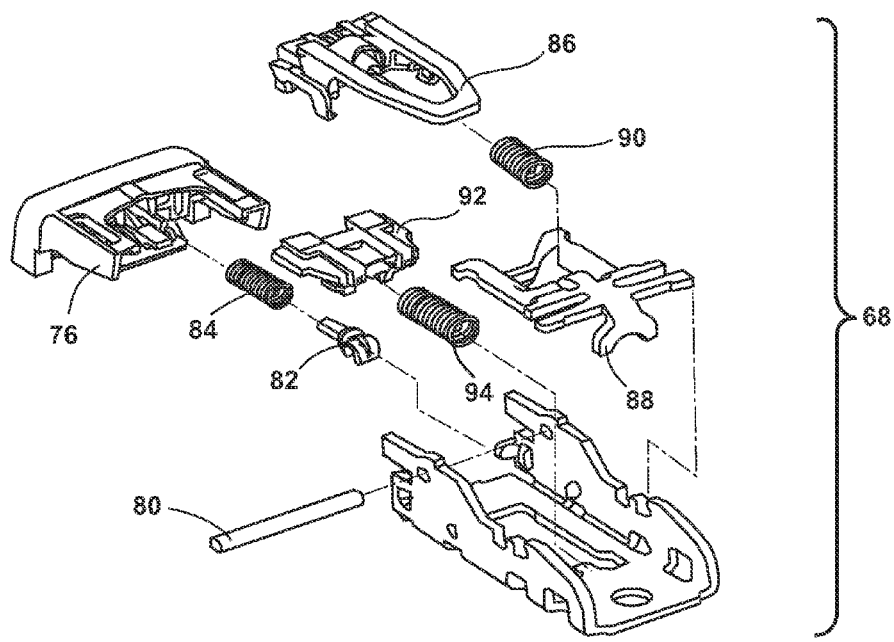
FIG. 6 is an exploded view of the latch mechanism of FIG. 5.

Referring now to FIGS. 5-6, the latch mechanism 68 is shown according to an exemplary embodiment. The latch mechanism 68 can be actuated either manually with a release button 76 or, alternatively, remotely through any device known in the art. The latch mechanism 68 illustrated includes a lock pin 80, to which the release button 76 is coupled with a collar 82 and a button spring 84. A slider 86 is coupled to a lock bar 88 with a slider spring 90. The slider 86 is held under the lock pin 80 when the buckle portion 56 of the tongue member 54 is engaged with the latch mechanism 68 (e.g., latched, locked, fastened, etc.). When the slider 86 is held under the lock pin 80 it restricts the motion of the lock bar 88 which, in turn, retains the buckle portion 56 in the latch mechanism 68. An ejector 92 is contacted by the buckle portion 56 and pushed inward when the buckle portion 56 is engaged with the latch mechanism 68, compressing an ejector spring 94 between the ejector 92 and the lock bar 88.

The latch mechanism 68 is released manually by depressing the button 76. The motion of the button 76 compresses the button spring 84 and contacts the slider 86, moving the slider 86 out from under the lock pin 80. The slider 86 compresses the slider spring 90 and allows the ejector 92 to push the lock bar 88 upwards. When this occurs, the slider 86, which is no longer retained in the "lock" position by the lock pin 80, rotates upward and releases the lock bar 88. Once the lock bar 88 has rotated away from the buckle portion 56, the buckle portion 56 pushes out of the latch mechanism 68 by the ejector 92 with the assistance of the ejector spring 94.

Figure 7:
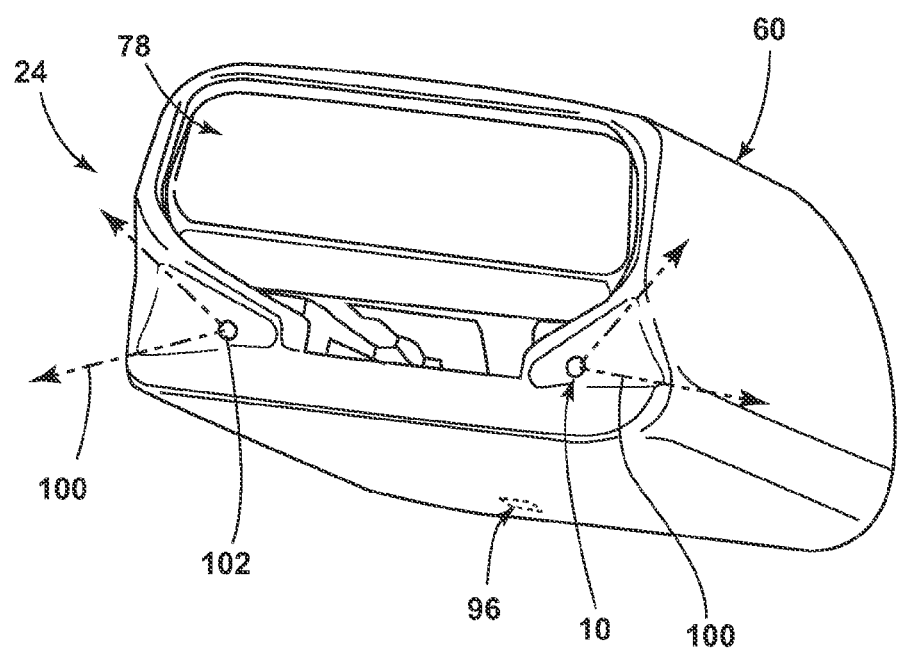
FIG. 7 is a top perspective view of the assembled, illuminated buckle illuminating a portion of a top surface of the buckle.

Referring to FIG. 7, the lighting system 24 is configured such that the buckle 60 emits light through at least a portion of the housing 62 and/or latch mechanism 68 based on predefined events or criteria. Accordingly, the lighting system 24 includes a light source 96 and a photoluminescent structure within the buckle 60. The light source 96 may be over molded, or otherwise attached, to a portion of the seatbelt assembly 26, such as an inner surface of the buckle housing 62. As described above, the photoluminescent structure 10 contains at least one photoluminescent material 22 and is configured to emit outputted light 100 in response to inputted light 98 emitted from the light source 96. The light source 96 may be powered using a vehicle power source 102.

Still referring to FIG. 7, the photoluminescent structure 10 may be applied or otherwise arranged proximate to an aperture 104 in the housing 62, according to one embodiment. More specifically, light emitted from the light source 96 at a first wavelength may be converted by the photoluminescent structure 10 and re-emitted as light having a different second wavelength, typically in the visible spectrum. Such a configuration may assist an occupant of the vehicle 28 in attaching their seatbelt to the appropriate location when the lighting system 24 is in the illuminated state. The light source 96 is configured to output a first wavelength of inputted light 98. In response to receiving the inputted light 98 at the first wavelength, the photoluminescent structure 10 illuminates and emits outputted light 100 at least at a second wavelength, as described above. The inputted light 98 and outputted light 100 may differ in wavelength. It is contemplated that the lighting system 24, and more particularly, the light source 96, may direct light towards a wide range of target locations such that the lighting system 24 may be used for a plurality of functions. Exemplary functions include usage as an entry lamp, ambient lighting, assisting in functions such as buckling the seatbelt assembly 26, and/or a warning light for when the seatbelt assembly 26 is not placed in the locked position.

In some embodiments, a plurality of photoluminescent structures 10, 128 may be disposed within the lighting system 24. Each of the plurality of photoluminescent structures 10, 128 may incorporate one or more photoluminescent materials 22 configured to emit a specific color light in response to the excitation generated in response to the light emitted from the light source 96. In some embodiments, a combination of photoluminescent materials 22 may be utilized within the photoluminescent structures 10, 128 to output various wavelengths corresponding to different colors of light.

Referring to FIGS. 8A-8B, the lighting system 24 employed within the seatbelt assembly 26 is illustrated, according to one embodiment. As illustrated in FIG. 8B, the light source 96 may be disposed on a printed circuit board (PCB) 106. The PCB 106 may be secured to any portion of the buckle 60 such that a light source 96 disposed on the PCB 106 is positioned towards a desired target location. The PCB 106 may include a white solder mask to reflect light incident thereon. Conductive leads 108, 110 are connected to the PCB 106 and are disposed through a seatbelt harness 112 to any power source 102 within the vehicle 28.

The light source 96, as illustrated in FIG. 8B is centrally disposed on the PCB 106 in a position within the housing 62 and below the latch mechanism 68. The light source 96 may include any form of light source 96, for example fluorescent lighting, light emitting diodes (LEDs), organic LEDs (OLEDs), polymer LEDs (PLEDs), solid state lighting, and/or any other form of lighting device. Moreover, according to one embodiment, the light source 96 may emit inputted light 98 that is in the blue light, violet light, and/or the UV light spectrums.

As shown in FIG. 8A, the upper portion 64 of the housing 62 may include a light guide 114 according to one embodiment. As shown in FIG. 8A, the light guide 114 includes a first, cylindrical portion 116 that partially surrounds and covers a top portion of the light source 96 and an optical grade light pipe 118. As illustrated, a pair of light pipes 118 directs light towards the pair of apertures 104 in the housing 62. The light illumination may be used for any function.

According to one embodiment, the photoluminescent structure 10 may be disposed within the light pipe 118. Accordingly, inputted light 98 emitted from the light source 96 may be converted from a first, inputted wavelength to a second, outputted wavelength as the light travels through the light pipe 118. The outputted light 100 may be directed outwardly through a portion of the buckle 60.

The photoluminescent structure 10 may include a single photoluminescent material 22, which is configured to convert inputted light 98 received from light source 96 into an outputted light 100 having a wavelength different than that associated with the inputted light 98. More specifically, the photoluminescent material 22 is formulated to have an absorption spectrum that includes the emission wavelength of the inputted light 98 supplied from the light source 96. The photoluminescent material 22 is also formulated to have a Stokes shift resulting in the converted visible light 100 having an emission spectrum expressed in a desired color, which may vary depending on the lighting application. The converted visible light 100 is outputted from the light source 96 via the apertures 104, thereby causing the top surface 78 of the housing 62 to illuminate in the desired color. In one embodiment, the energy conversion process is undertaken by way of down conversion, whereby the inputted light 98 includes light on the lower end of the visible spectrum such as blue, violet, or ultraviolet (UV) light. Doing so enables blue, violet, or UV LEDs to be used as the light source 96, which may offer a relative cost advantage over simply using LEDs of the desired color and foregoing the energy conversion process altogether. Furthermore, the illumination provided by the top surface 78 of the housing 62 may offer a unique, substantially uniform, and/or attractive viewing experience that may be difficult to duplicate through non-photoluminescent means. It should be appreciated that the photoluminescent structure 10 may be disposed on or in other portions of the light pipe 118 and may be dependent both on and in the light pipe 118.

Figure 9A:
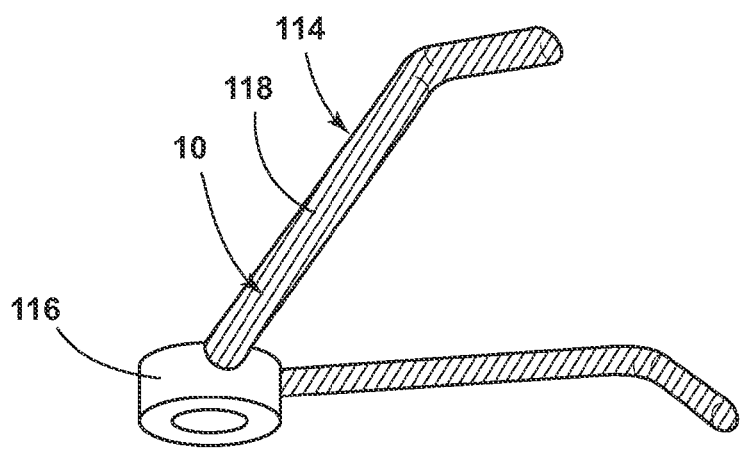
FIG. 9A is a perspective view of the light guide having a photoluminescent structure within a light pipe of the light guide, according to one embodiment.
Figure 9B:
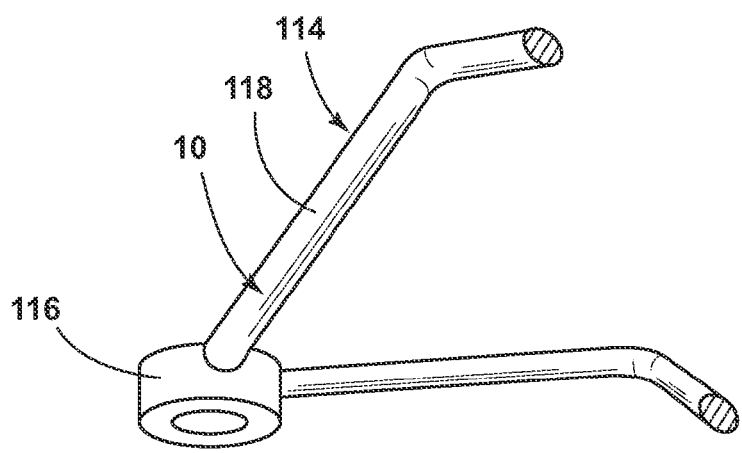
FIG. 9B is a perspective view of the light guide having a photoluminescent structure disposed on an end portion of the light pipe, according to one embodiment.

Referring to FIGS. 9A-9B, exemplary light guides 114 having a photoluminescent structure therein and/or thereon are respectively illustrated. As shown in FIG. 9A, the photoluminescent structure 10 is disposed within the light pipe 118 of the light guide 114. As shown in FIG. 9B, the photoluminescent structure 10 is disposed on an end portion of the light pipe 118.

As illustrated in FIG. 9A, the light pipe 118 may be integrally formed with a photoluminescent material such that inputted light 98 emitted from the light source 96 is converted to outputted light 100 as the light is directed towards a desired location, such as the apertures 104. The photoluminescent structure 10 may be disposed on an interior surface of the light pipe 118. Or, alternatively, the photoluminescent structure 10 may be disposed within the material forming the light pipe 118.

As illustrated in FIG. 9B, the photoluminescent structure 10 may be disposed on an end portion of the light pipe 118. The light source 96 emits inputted light 98 at a first wavelength that is directed towards a desired location, such as the apertures 104. As the inputted light 98 exits the end portion of the light pipe 118, the inputted light 98 is converted to outputted light 100 of a different wavelength. A reflective material 144 may be applied to any surface of the light pipe 118 for assisting in directing light towards the end portion of the light pipe 118.

Still referring to FIGS. 9A-9B, the first, cylindrical portion 116 and the light pipe 118 are both substantially transparent and translucent suitable for transmitting light as emitted from the light source 96. The cylindrical portion 116 and the light pipe 118 may be formed from a rigid material that includes a curable substrate such as a polymerizable compound, a mold in clear (MIC) material or mixtures thereof. Acrylates are also commonly used for forming rigid light pipes 118, as well as poly methyl methacrylate (PMMA) which is a known substitute for glass. A polycarbonate material may also be used in an injection molding process to form the rigid light pipe 118. Further, the cylindrical portion 116 and the light pipe 118 may be a flexible light guide 114, wherein a suitable flexible material is used to create each component. Such flexible materials include urethanes, silicone, thermoplastic polyurethane (TPU), or other like optical grade flexible materials. Whether the cylindrical portion 116 and/or the light pipe 118 are flexible or rigid, the cylindrical portion 116 and the light pipe 118, when formed, are substantially optically transparent and/or translucent and capable of transmitting light. The cylindrical portion 116 and/or the light pipe 118 may be referred to as a light guide, a light plate, a light bar or any other light carrying substrate made from a clear or substantially translucent plastic, glass or other light transmission material.

Figure 10:
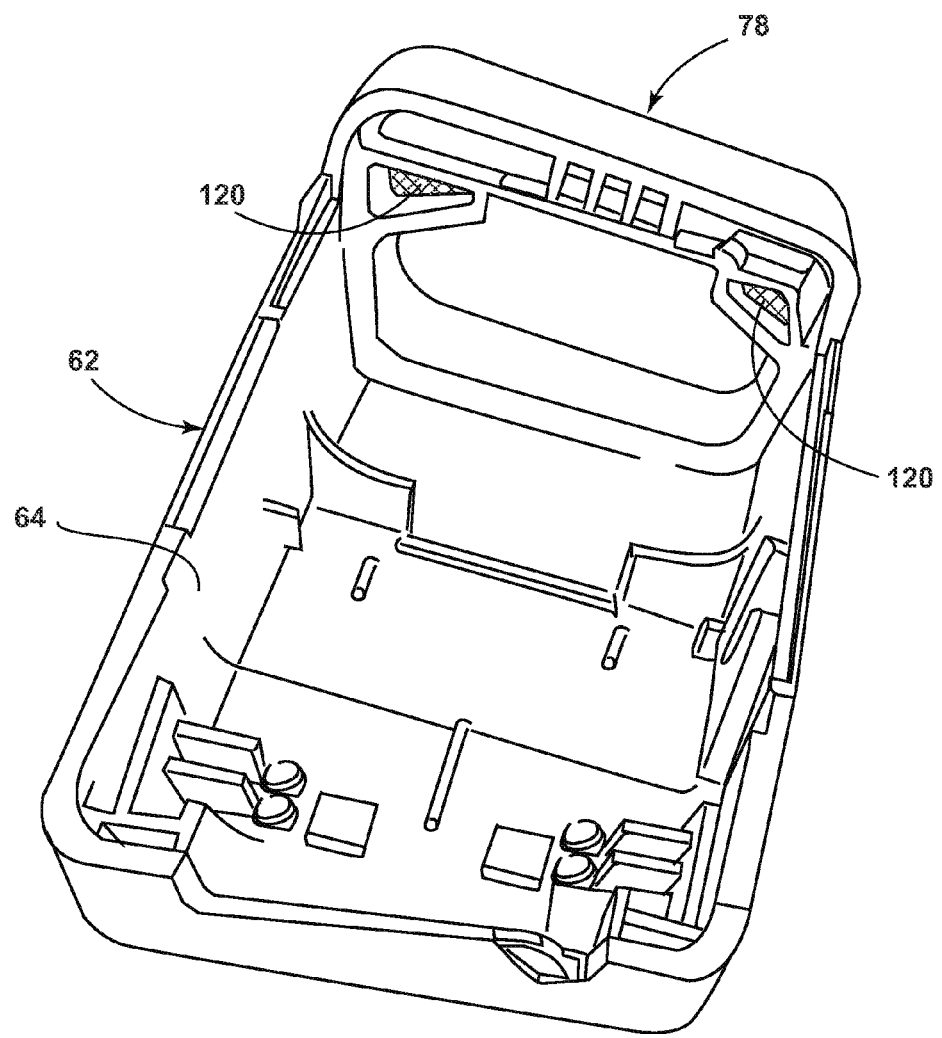
FIG. 10 is a bottom perspective view of the upper portion of the housing having a diffuser disposed in the top surface of the housing, according to one embodiment.

Referring to FIG. 10, the upper portion 64 of the housing 62 is illustrated having a diffuser 120 disposed proximate the top surface 78 thereof. The light diffuser 120 may be molded, or alternatively mounted, between the top surface 78 of the housing 62 and the light guides 114. For example, the light diffuser 120 may be a layer that is applied to a portion of the top surface 78 via partial vacuum deposition. The diffuser 120 can be transparent or translucent and generally functions to diffuse the light from the light guides 114 so that hot spots and shadows are eliminated. Additionally, or alternatively, the diffuser 120 may be applied to a portion of the light guide 114 in order to optimize the light diffusing effect. According to one embodiment, the diffuser 120 has a cloudy, white color that substantially conceals the photoluminescent structure 10 within the housing 62.

Still referring to FIG. 10, the housing 62 is shown molded from a polymeric material according to one embodiment. Additionally, the housing 62 is generally opaque such that light emitted from the light source 96 does not pass through opaque portions of the housing 62 and may exit the housing 62 in desired and predefined locations such as at diffusers 120. Accordingly, the lighting system 24 may provide assistance in the coupling of the seatbelt assembly 26 components in otherwise poor lighting conditions.

Figure 11:
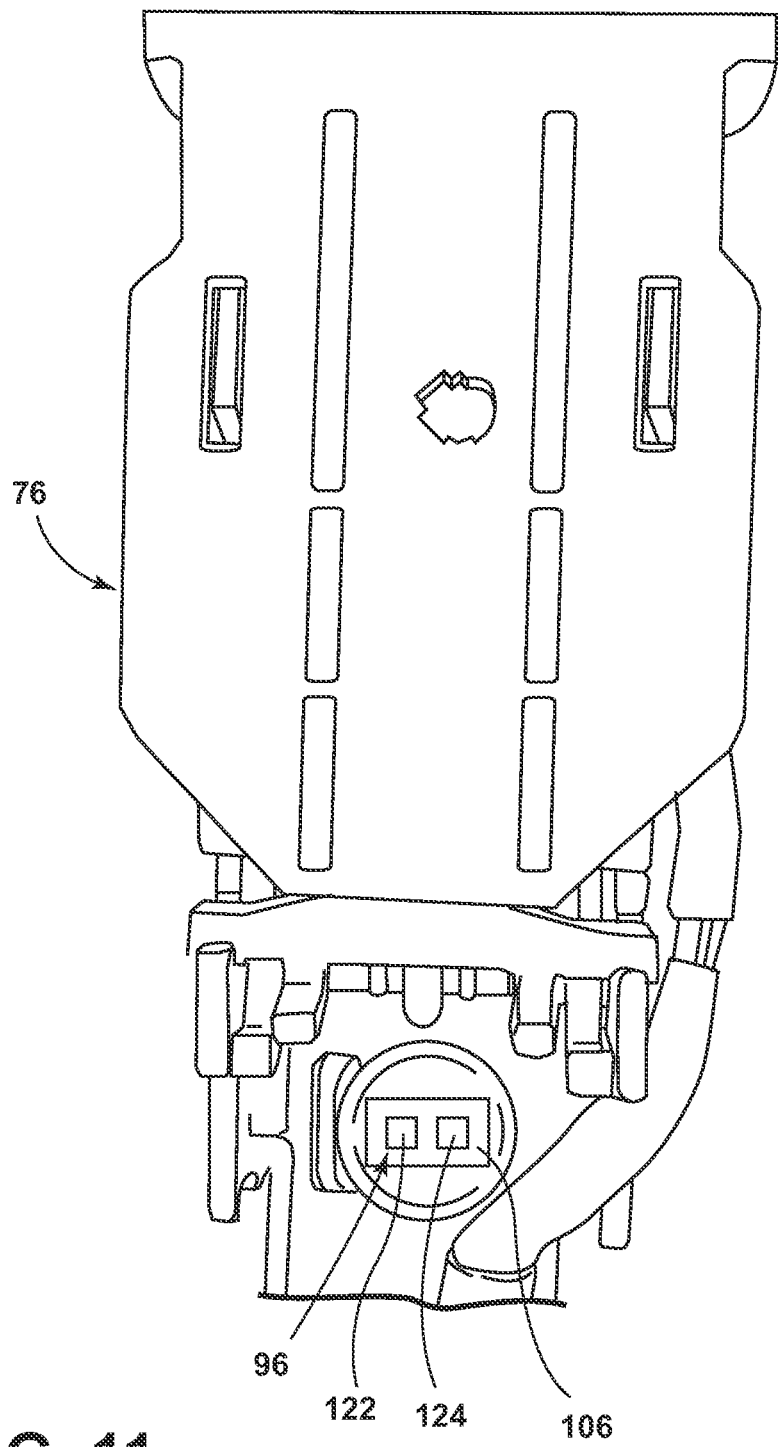
FIG. 11 is a top plan view of the latch mechanism having a plurality of light sources disposed on a portion thereof.
Figure 12:
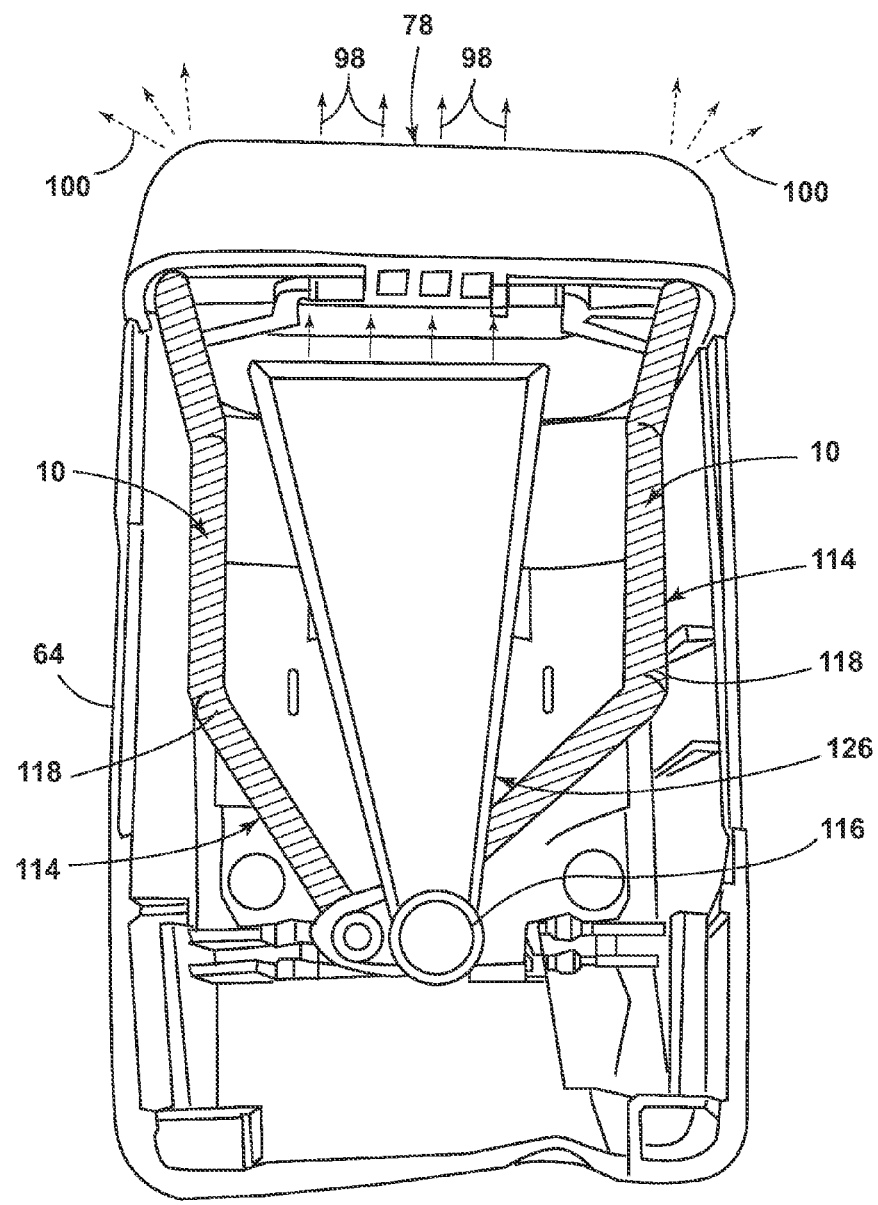
FIG. 12 is a bottom perspective view of the upper portion of the housing having first and second light guides attached to the inner surface of the upper portion of the housing.

Referring to FIGS. 11-12, an alternate embodiment of the lighting system 24 is illustrated having the light source 96 configured as a plurality of LEDs 122, 124. The first LED 122 illuminates within a first color spectrum, such as the blue light, violet light, and/or UV light spectrum. The second LED 124 source illuminates in a second color spectrum, such as red light spectrum. Likewise, the first light guide 114 directs the light emitted form the first LED 122 towards predefined locations on the top surface 78 of the housing 62.

A second light guide 126 is configured to direct light from the second LED 124 towards the top surface 78 of the housing 62, such as the tongue receiving slot 70 of the release button 76. The second light guide 126 may have a first end portion that partially covers the second light source and a second end portion that is disposed proximate to the top surface 78 of the housing 62. As illustrated, the second light guide 126 has a triangular shape; however, it will be appreciated that the second light guide 126 may be configured in any practicable shape. Moreover, the second light guide 126 may illuminate a plurality of components within the buckle 60. Exemplary components include the release button 76, the tongue receiving slot 70, and/or other components of the latch mechanism 68.

As illustrated, the first LED 122 illuminates independently based on any desired lighting sequence within the vehicle 28, such as a welcome/farewell sequence. The second LED 124 may illuminate contemporaneously with the first LED 122. For example, as an occupant enters the vehicle 28, the first LED 122 may illuminate. Once a seat 32 is occupied with the buckle 60 placed in the unlocked position for a predefined amount of time, such as sixty seconds, the second LED 124 may illuminate. According to one embodiment, the first LED 122 illuminates in a blue color and the second LED 124 illuminates in a red color. The second LED 124 may also illuminate at a greater intensity than the first LED 122. For example, the second LED 124 may be configured to be twenty times more powerful than the first LED 122. In alternate embodiments, the second LED 124 may receive about fifty times the electric current of the first LED 122 through pulsing of the current to the second LED 124.

As discussed above, the second LED 124 may be simultaneously illuminated with the first LED 122 such that substantially all of the top surface 78 of the buckle 60 is illuminated when both LEDs 122, 124 are illuminated. Such a configuration may draw attention to the unlocked buckle 60. Additionally, the release button 76 may be formed from a red, translucent material such that the release button 76 acts as an optical filter that allows the release button 76 to better illuminate with red light than if the release button 76 were to be formed of a material of another color.

Figure 13:
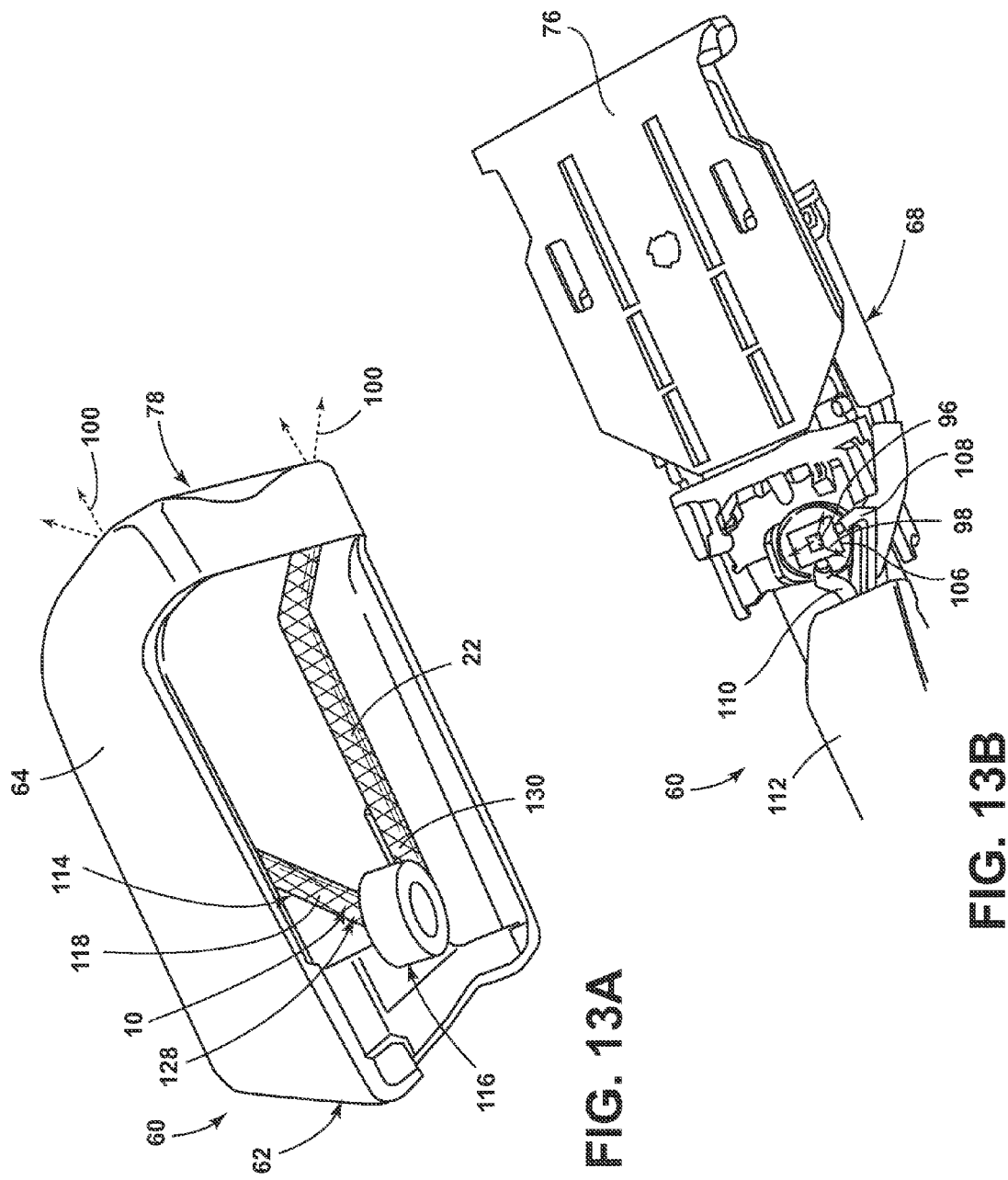
FIG. 13A is a bottom perspective view of the upper portion of the housing having a plurality of photoluminescent structures within the light guide.
FIG. 13B is a top perspective view of the latch mechanism having a light source thereon that emits inputted light in a plurality of wavelengths to excite the plurality of photoluminescent structures within the illuminated buckle.

Referring to FIGS. 13A-13B, the buckle 60 includes a plurality of photoluminescent structures 10, 128 having first and second photoluminescent materials 22, 130 that are interspersed within a portion, such as the light pipes 118, thereof. Alternatively, the photoluminescent materials 22, 130 may be isolated from each other if desired. Also, it will be appreciated that the buckle 60 may include more than two different photoluminescent materials 22, 130, in which case, the teachings provided herein similarly apply.

As illustrated in the embodiment shown in FIGS. 13A-13B, the excitation of photoluminescent materials 22, 130 is mutually exclusive. That is, photoluminescent materials 22, 130 are formulated to have non-overlapping absorption spectrums and Stoke shifts that yield different emission spectrums. Also, in formulating the photoluminescent materials 22, 130, care should be taken in choosing the associated Stoke shifts such that the converted light 100 emitted from one of the photoluminescent materials 22, 130, does not excite the other, unless so desired. According to one exemplary embodiment, the light source 96 is configured to emit light at a plurality of wavelengths. However, in alternate embodiments, multiple light sources 96 that emit light at varying wavelengths may alternatively, or additionally, be employed. As illustrated in FIGS. 13A-13B, the light source 96 is configured to emit an inputted light 98 having a first inputted wavelength 98 that only excites photoluminescent material 22 and results in the inputted light 98 being converted into a visible light 100 of a first color (e.g., white). Likewise, the light source 96 also emits the inputted light 98 at a second wavelength that only excites the second photoluminescent material 130 and results in the inputted light 98 being converted into a visible light 100 of a second color (e.g., red). Preferably, the first and second colors are visually distinguishable from one another. In this manner, the light source 96 may be selectively activated using the controller 132 to cause the photoluminescent structure 10 to luminesce in a variety of colors.

Alternatively still, the light source 96 may emit the first and second emissions in concert, thereby causing both of the photoluminescent materials 22, 130 to become excited, resulting in a portion of the buckle 60 illuminating in a third color, which is a color mixture of the first and second color (e.g., pinkish). The intensities of the inputted light 98 emitted from the light source 96 may also be proportionally varied to one another such that additional colors may be obtained. For energy conversion layers containing more than two distinct photoluminescent materials 22, a greater diversity of colors may be achieved. Contemplated colors include red, green, blue, and combinations thereof, including white, all of which may be achieved by selecting the appropriate photoluminescent materials 22 and correctly manipulating their corresponding light sources.

Figure 14:
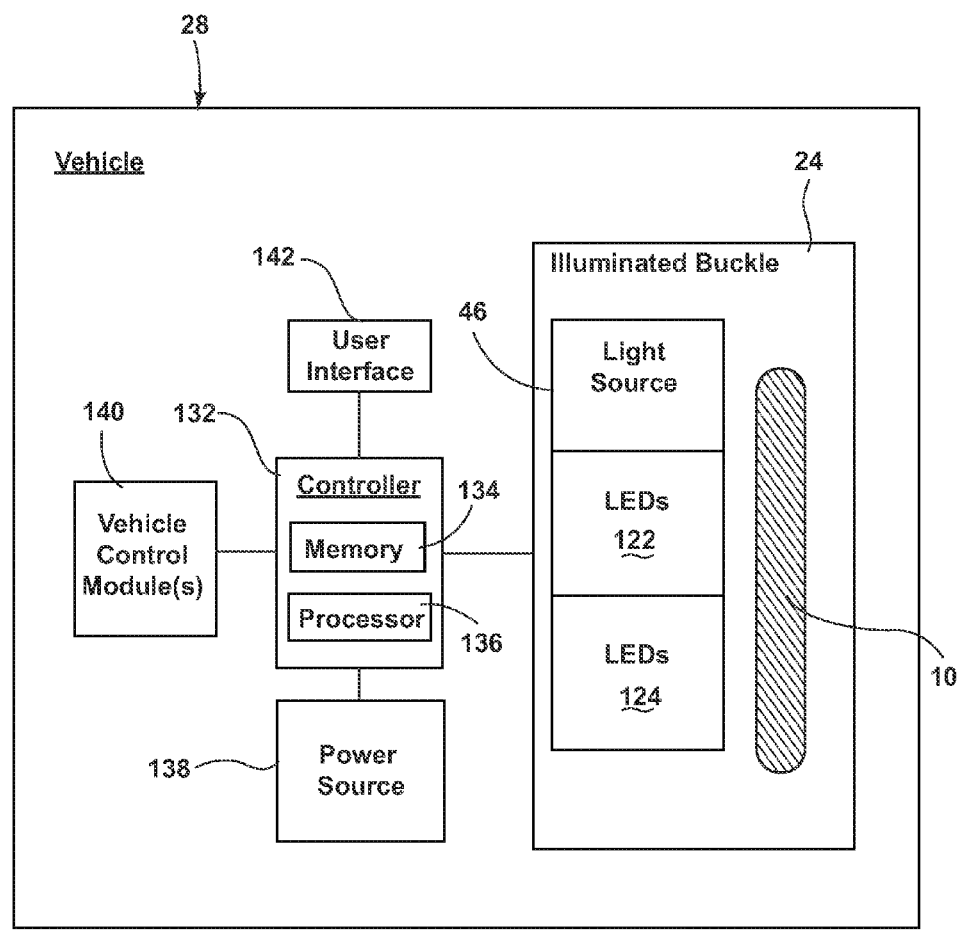
FIG. 14 is a block diagram of the vehicle and the illuminated buckle.

Referring to FIG. 14, a block diagram of a vehicle 28 is shown in which the lighting system 24 is implemented. The illuminated buckle 60 includes a controller 132 in communication with the light source 96. The controller 132 may include memory 134 having instructions contained therein that are executed by a processor 136 of the controller 132. The controller 132 may provide electrical power to the light source 96 via the power source 102 located onboard the vehicle 28. In addition, the controller 132 may be configured to control the light output of each light source 96 based on feedback received from one or more vehicle control modules 140 such as, but not limited to, a body control module, engine control module, steering control module, brake control module, the like, and/or a combination thereof. By controlling the light output of the light source 96, the illuminated buckle 60 may illuminate in a variety of colors and/or patterns to provide an aesthetic appearance, or may provide vehicle 28 information to an intended observer. For example, when the seat 32 is occupied with an unlocked buckle 60, a portion of the buckle 60 may become illuminated in a desired color.

In operation, the photoluminescent structure 10 may exhibit a constant unicolor or multicolor illumination. For example, the controller 132 may prompt the light source 96 to emit only the first wavelength of light via an LED to cause a photoluminescent structure 10 to illuminate in the first color (e.g., white). Alternatively, the controller 132 may prompt the light source 96 to emit only the second wavelength of light via the LED to cause the photoluminescent structures 10, 128 to illuminate in the second color (e.g., red). Alternatively still, the controller 132 may prompt the light source 96 to simultaneously emit the first and second wavelengths of light to cause the photoluminescent structures 10, 128 to illuminate in a third color (e.g. pinkish) defined by an additive light mixture of the first and second colors. Moreover, additional photoluminescent structures 10, 128 may be added to the illuminated buckle 60 that converts the light emitted from the light source 96 to a different wavelength. Alternatively still, the controller 132 may prompt the light source 96 to alternate between periodically emitting the first and second wavelengths of light to cause the photoluminescent structure 10 to periodically illuminate by alternating between the first and second colors. The controller 132 may prompt the light source 96 to periodically emit the first and/or second wavelengths of light at a regular time interval and/or an irregular time interval.

In another embodiment, the illuminated buckle 60 may include a user interface 142. The user interface 142 may be configured such that a user may control the wavelength of light that is emitted by the LEDs 122, 124 and/or the LEDs 122, 124 that are illuminated. Such a configuration may allow a user to control which features are illuminated to assist in locating a desired feature. The user interface 142 may be disposed within the vehicle 28 cabin or on any surface that is accessible to the user during utilization of the illuminated buckle 60 described herein. The user interface 142 may use any type of control known in the art for controlling the light source 96, such as, but not limited to, proximity sensors.

With respect to the above examples, the controller 132 may modify the intensity of the emitted first and second wavelengths of light by pulse-width modulation (PWM) or current control. In some embodiments, the controller 132 may be configured to adjust a color of the emitted light 100 by sending control signals to adjust an intensity or energy output level of the light source 96. For example, if the light source 96 is configured to output the first emission at a low level, substantially all of the inputted light 98 may be converted to the outputted, visible light. If the light source 96 is configured to emit inputted light 98 at a high level, only a portion of the inputted light 98 may be converted to the outputted light 100 by the photoluminescent structure 10. In this configuration, a color of light corresponding to mixture of the inputted light 98 and the outputted light 100 may be output as the emitted light 100. In this way, each of the controllers 132 may control an output color of the emitted light 100.

Though a low level and a high level of intensity are discussed in reference to the inputted light 98, it shall be understood that the intensity of the inputted light 98 may be varied among a variety of intensity levels to adjust a hue of the color corresponding to the emitted light 98, 100 from the illuminated buckle 60. As described herein, the color of the outputted light 100 may be significantly dependent on the particular photoluminescent materials 22 utilized in the photoluminescent structure 10. Additionally, a conversion capacity of the photoluminescent structure 10 may be significantly dependent on a concentration of the photoluminescent materials 22 utilized in the photoluminescent structure 10. By adjusting the range of intensities that may be emitted from the light source 96, the concentration and proportions of the photoluminescent materials 22 in the photoluminescent structure 10 and the types of photoluminescent materials 22 utilized in the photoluminescent structure 10 discussed herein may be operable to generate a range of color hues of emitted light by blending the inputted light 98 with the outputted light 100. It is also contemplated that the intensity of each light source 96 may be varied simultaneously, or independently, from any number of other light sources 96.

Accordingly, a lighting system configured to illuminate a seatbelt buckle has been advantageously described herein. The lighting system may provide various benefits including a simple and cost-effective means to produce a variety of illumination that may be used as a styling feature and/or to assist an occupant in the usage of the illuminated seating assembly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It will be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illuminated buckle, comprising:
   a housing and a latch mechanism disposed within a vehicle;
   a first light source disposed within the housing;
   a first light guide directing light from the first light source towards a surface of the housing; and
   a first photoluminescent structure disposed within the light guide and configured such that the light guide luminesces in response to excitation by the first light source.

2. The illuminated buckle of claim 1, wherein the photoluminescent structure is disposed within the light guide.

3. The illuminated buckle of claim 2, wherein the first photoluminescent structure comprises at least one photoluminescent material configured to convert an inputted light received from at least a portion of the first light source into a visible light that is outputted to the surface.

4. The illuminated buckle of claim 3, wherein the inputted light comprises one of blue light, violet light, and UV light.

5. The illuminated buckle of claim 1, wherein the light guide includes a first portion that partially encompasses the first light source and a light pipe attached to the first portion.

6. The illuminated buckle of claim 1, wherein the photoluminescent structure illuminates a top surface of the buckle to assist in placing a tongue member into a tongue receiving slot.

7. The illuminated buckle of claim 1, further comprising:
   a second light source disposed proximate a second light guide that is configured to illuminate a release button on the buckle.

8. A seatbelt buckle for a vehicle, comprising:
   a housing;
   a latch mechanism;
   a first light source disposed within the housing optically coupled to a first light guide that is configured to illuminate a first portion of the buckle;
   a pair of apertures proximate a tongue receiving slot, wherein the first light guide directs outputted light through the apertures to illuminate the tongue receiving slot;
   a diffuser disposed in the pair of apertures and proximate one end portion of the first light guide, wherein the diffuser is configured to direct light outward from the housing;
   a second light source disposed within the housing and optically coupled to a second light guide that is configured to illuminate a second portion of the buckle; and
   a luminescent structure configured to emit outputted light in response to excitation by inputted light emitted by the first light source.

9. The seatbelt buckle for a vehicle of claim 8, wherein the housing is formed from an opaque material.

10. The seatbelt buckle for a vehicle of claim 9, wherein the luminescent structure comprises at least one luminescent material configured to down convert an inputted light received from at least a portion of the first light source into a visible light that is outputted to a viewable portion.

11. The seatbelt buckle for a vehicle of claim 10, wherein the first light source emits inputted light that comprises one of a blue light, violet light, and UV light.

12. A seatbelt buckle, comprising:
    a housing having a latch mechanism therein;

a first light source emitting non-visible light within the housing and optically coupled to a first light guide that excites a photoluminescent structure;

a second light source emitting visible light within the housing and optically coupled to a second light guide; and a diffuser disposed in a housing aperture and operably coupled with the first light guide for directing light outward from the housing.

13. The seatbelt buckle of claim 12, further comprising:
a photoluminescent structure configured to emit outputted light in response to excitation by the non-visible light emitted by the first light source.

14. The seatbelt buckle of claim 13, wherein the photoluminescent structure is disposed within the first light guide.

15. The seatbelt buckle of claim 13, wherein the photoluminescent structure is disposed on an end portion of the first light guide.

16. The seatbelt buckle of claim 13, wherein the photoluminescent structure comprises at least one photoluminescent material configured to convert an inputted light received from the first light source into a visible light.

17. The seatbelt buckle of claim 12, wherein the first light source is illuminated simultaneously with the second light source such that a top portion of the housing is illuminated by the first and second light sources.

18. The seatbelt buckle of claim 12, wherein the second light source is supplied with more current than the first light source.

19. The seatbelt buckle of claim 12, wherein the second light source emits red light.

20. The seatbelt buckle of claim 12, further comprising a controller for controlling an activation state of the first and second light sources in response to at least one vehicle-related condition.

* * * * *